July 31, 1951  R. E. GUNTER  2,562,862
TIRE PRESSURE INDICATOR
Filed Oct. 16, 1950
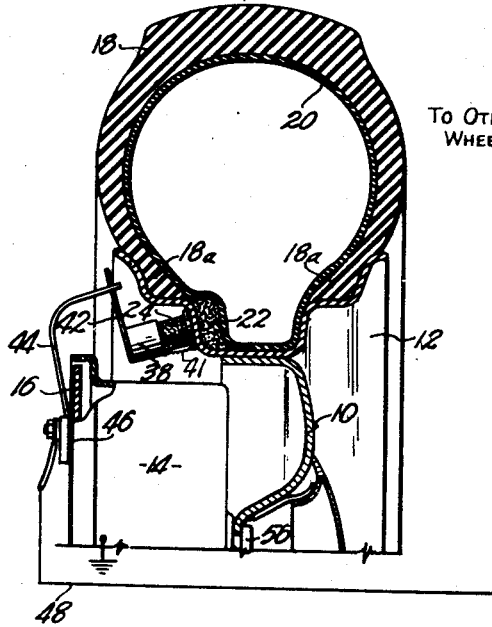
Fig. 1.
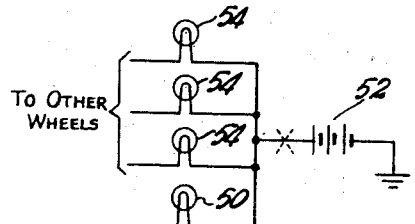
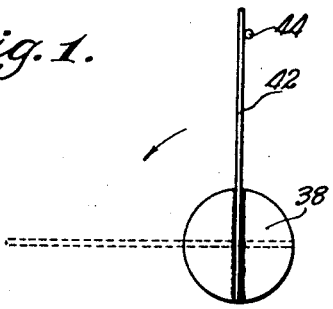
Fig. 4.
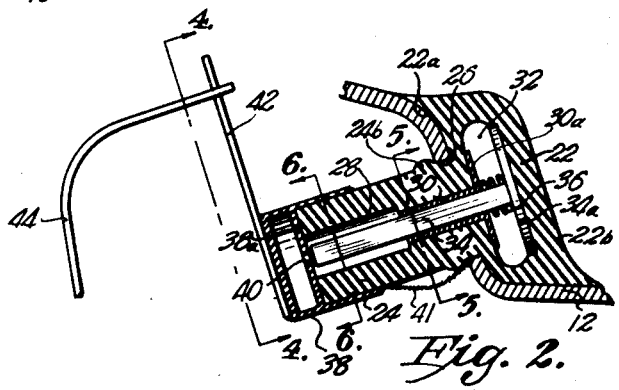
Fig. 2.
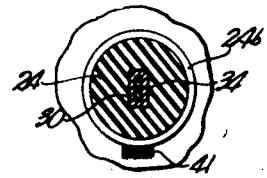
Fig. 5.
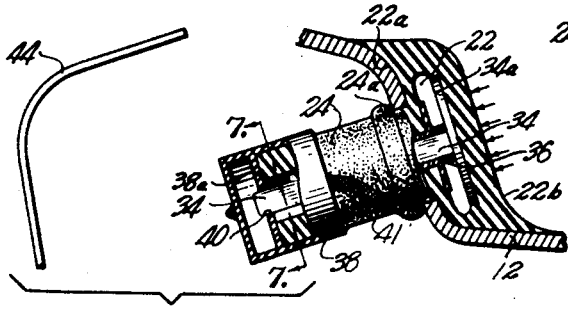
Fig. 3.
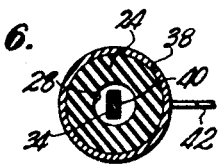
Fig. 6.
Fig. 7.
INVENTOR.
Robert E. Gunter
BY
ATTORNEY.

UNITED STATES PATENT OFFICE 2,562,862

TIRE PRESSURE INDICATOR

Robert E. Gunter, Kansas City, Mo., assignor of one-half to Jack W. Comer, Kansas City, Mo.

Application October 16, 1950, Serial No. 190,323

7 Claims. (Cl. 200—58)

The present invention relates in general to pressure indicating devices, and it refers more particularly to an improved type of pressure actuated device and associated signaling system for use in connection with the pneumatic tires of a motor vehicle.

It is an important object of my invention, broadly speaking, to provide, in connection with a motor vehicle, a warning system by which the motorist will be immediately apprized of the under-inflated condition of any of the tires of the vehicle. Another object is to give the motorist an immediate indication of which tire of the vehicle is under-inflated.

A further object of the invention is to provide, in connection with the tires of a motor vehicle or the like, a device which operates responsive to tire pressure dropping below a predetermined minimum safe value and thereafter is effective to bring in a visible and/or audible signal before the operator of the vehicle.

Another object is to provide on the rim of an automobile wheel a pressure sensitive device adapted to operate when the tire pressure drops below a predetermined value; and in this connection it also is an object to provide a device of the character indicated which is simple in design, economical to manufacture, and easily installed on the rim of a conventional wheel without undue alteration in the wheel structure or other components of the vehicle.

An important feature of the invention resides in the novel construction of my pressure-sensitive device.

Other and further objects of the invention, together with the features of novelty by which the objects are achieved will appear in the course of the following description.

In the accompanying drawings, which form a part of the specification and are to be read in conjunction therewith, and in which like reference numerals are employed to indicate like parts of the various views:

Fig. 1 is a sectional elevation of a conventional motor vehicle wheel having mounted thereon a pneumatic tire, the pressure-responsive device of my invention being shown in elevation and the associated electrical signaling circuit being illustrated schematically, Fig. 2 is an enlarged longitudinal cross-section of my pressure-responsive device, showing the same in the position it occupies when the tire is under-inflated, Fig. 3 is a sectional elevation similar to Fig. 2 showing my pressure device in its normal position, i. e., the position it occupies when the tire is properly inflated, Fig. 4 is a sectional elevation taken along the line 4—4 of Fig. 2 in the direction of the arrows, Fig. 5 is a sectional elevation taken along the line 5—5 of Fig. 2 in the direction of the arrows, Fig. 6 is a sectional view taken along the line 6—6 of Fig. 2 in the direction of the arrows, and Fig. 7 is a sectional view taken along the line 7—7 of Fig. 3 in the direction of the arrows.

Referring more particularly to Fig. 1, the numeral 10 designates an automobile wheel carrying a conventional drop center rim 12. The wheel is mounted on the brake drum housing 14 to rotate therewith, the inner side of this housing being covered by a stationary back plate 16 in usual fashion.

Received in the rim is a pneumatic tire comprising a casing 18 with an inner tube 20; when inflated, as shown, the tube seats the opposed annular edges 18a of the casing forcibly in the raised flange portions of the rim, and itself protrudes through the opening between these edges into the drop center of the rim. This brings it into engagement with the head portion 22 of my pressure sensitive device now to be described.

As best seen in Figs. 2 and 3, this device comprises a hollow stem 24 of rubber or similar resilient elastic material extending through an aperture 26 in the side of the rim; inside the rim the stem has an integral bulbular enlargement forming the head 22. This head has one face 22a shaped to conform to the inner surface of the rim, while the opposite face 22b, engaged by the tube 20, tapers circumferentially of the rim from the thickened central portion of the head to thin edges lying forwardly and rearwardly of the aperture 26. A bead 24a encircling the stem 24 outside the rim prevents accidental dislodgement of the stem when the tire is removed from the rim, it being understood, however, that this may be forcibly compressed and squeezed through aperture 26 when the tire is off the rim in order to permit removal or replacement of the pressure-sensitive unit if desired.

Stem 26 is provided with a circular bore 28 extending axially inward from the end slightly more than half the length of the stem. A rectangular sleeve 30 extends into the end of this bore from the cavity 32 in the head portion 22, this sleeve having an integral flange 30a in the latter cavity; as shown in Fig. 5, the material of stem 24 closely embraces the exterior of this sleeve so there can be no rotation of the sleeve in the stem about its own longitudinal axis.

Supported in sleeve 30 and axially slidable therein is a thin flat blade or shaft 34. This has at one end an enlarged flat head 34a disposed in cavity 32 and urged away from flange 24a by a coiled compression spring 36 encircling the shaft; the opposite end of the shaft projects into the circular bore 28 and terminates approximately flush with the end of stem 24.

Bonded to the end of stem 24 with cement or in any other suitable fashion is a cylindrical cup-shaped metal cap 38 having a false bottom 38a containing an elongated slot 40 adapted to register with and receive the tip of the flat shaft 34 when the longitudinal axis of the slot is aligned parallel with the plane of the shaft. For electrical purposes, the cap is connected by a flexible braided cable 41 to the rim 12 of the wheel, the connection conveniently being effected by inserting the end of the cable through aperture 26 and anchoring it between the inner face of the rim and the enlarged head 22 of my device.

An elongated, somewhat flexible finger 42 is welded or otherwise secured to the cap 38 so it projects transverse to the axis of stem 24. A second finger 44 is mounted on an insulator 46 carried by the stationary back plate 16, this finger having a curved end which projects over the edge of the brake drum into the path of finger 42 when the latter occupies a position radial to the axis about which the wheel turns (see Figs. 1 and 2). Finger 44 is connected by a conductor 48 to one terminal of a lamp 50, the other terminal of which is connected to a battery 52. It will be understood that all wheels of the vehicle are equipped like the one shown, and three other lamps 54 are connected to similar fingers on the remaining three wheels of the automobile; all four of these lamps preferably are located on the dashboard of the vehicle within sight of the operator.

In order to understand the operation of my device, let it be assumed, referring to Fig. 2, that a tire has just been placed on the rim of the wheel and still is in relatively deflated condition. As air is forced into the inner tube to properly inflate the tire, the tube obviously tends to expand outwardly against the hollow head 22 which, being elastic and flexible, permits the outward thrust to be transmitted to the disk 34a and its attached flat shaft 34. In other words, the shaft is urged outwardly in an endwise direction, but it cannot in fact travel far because its path is blocked by the false bottom 38a of cap 38 (note that the elongated slot in the false bottom is at this time disposed cross-wise of the plane of shaft 34 as shown in Fig. 6, so the latter cannot pass therethrough).

When the tire has been properly inflated, my device is "cocked" by manually rotating cap 38 through an arc of 90° about the axis of stem 24 as shown by the arrow and dotted lines in Fig. 4. As best seen in Figs. 3 and 7, this brings the elongated slot 40 in the false bottom of the cap into alignment with the plane of shaft 34 which now advances through the slot under the influence of tire pressure, the extent of the advance being determined by the strength of spring 36, which, of course, is compressed and exerts an opposing force on the shaft.

Bearing in mind that cap 38 is bonded to the rubber stem 24, it will be clear that the aforementioned rotation of the cap twists the end portion of the stem about its own longitudinal axis and accordingly the stem imposes upon the cap a torque urging it back toward normal position, that is to say, the position shown in Figs. 1 and 2. However, shaft 34 in slot 40 holds the cap against restoration to normal, and thus maintains the device in "cocked" condition so long as the tire pressure remains at or above the safe minimum value. Also, while in this condition, it will be noted that the finger 42 is disposed circumferentially of the wheel in a position spaced radially inward from the curved tip of the stationary finger 44; therefore, on rotation of the wheel, finger 42 passes finger 44 on each revolution without touching it.

Now let it be assumed that because of slow leak, or for some other reason, there is a gradual loss of pressure in the tire. As this happens, the outward thrust on disk 34a diminishes, and coiled spring 36 urges the disk inwardly, drawing shaft 34 axially until its tip is withdrawn from slot 40 in the false bottom of the cap 38. This releases the cap, and immediately the twisted rubber stem restores same to its normal position, swinging finger 42 to a radial position (Figs. 1 and 2). Now, with each revolution of the wheel, finger 42 engages finger 44 and makes brief electrical connection therewith, it being understood that the fingers and stem 24 have sufficient flexibility and resilience to permit the moving finger 42 to pass the stationary finger 44 with but brief brushing contact.

Each time the fingers thus engage, a circuit is completed from ground (i. e., the automobile frame) through the wheel and rim, cable 41, cap 38, fingers 42 and 44, conductor 48, lamp 50 to battery 52, and back to the same ground. Accordingly, lamp 50 lights momentarily on each revolution of the wheel, and the flickering lamp calls the motorist's attention immediately to the fact that one of his tires is under-inflated. A different lamp, of course, will be lighted in this fashion for each of the wheels, so the motorist also is given an immediate indication as to which of his tires needs attention. If desired, an audible signal (e. g. a buzzer or bell) may be inserted in series with the lamps at the place indicated by the dotted X so that it will sound at the same time any lamp is energized.

The tire pressure at which my device is operative to bring in a signal as described above, is determined, obviously, by the strength of spring 36; springs of different strength can be used in accordance with what is considered the minimum safe pressure for the particular tire placed on the wheel rim. After a signal has been given, and the tire in question has been brought back up to proper pressure by introduction of the necessary air, it is only necessary to again "cock" my device by rotating cap 38 through 90° as explained hereinbefore, and once again it is ready to give the operator of the vehicle notice when the tire needs further attention.

It will be observed that my arrangement in no way interferes with the normal operation of the vehicle, and when in place it is on the inside of the wheel, hidden from sight. It will not interfere with the normal removal or replacement of tires, nor with the removal of the wheel as a whole from the brake housing 14 (by removal of studs 56) and the substitution of another wheel.

From the foregoing it will be seen that my invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible modifications of the invention may be made without departing from the scope thereof it is to be understood that all matter herein set forth or shown in the accompanying drawings is to be interpreted as illustrative and not in a limiting sense.

Having thus described my invention, I claim:

1. A pressure indicator for a pneumatic tire mounted on a wheel rim, comprising an elongated shaft carried by the rim and axially movable under control of the tire responsive to changes in the pressure thereof, means always preventing rotation of said shaft about its own longitudinal axis as said shaft moves axially under control of the tire, a member supported on the rim for rotation about said axis of the shaft, said member having a face transverse to said axis and confronting the tip of the shaft, said tip being non-circular in cross section and said face containing a non-circular socket conforming with said tip and adapted to receive said tip when said rotatable member occupies a predetermined angular position relative to said shaft, and means for imposing a torque on said member when it is in said position, whereby said member is adapted to rotate to a different position responsive to withdrawal of said tip from said socket upon axial movement of said shaft.

2. A tire pressure indicator comprising a resiliently flexible tubular housing mounted on the rim of a vehicle wheel, a plunger member supported in said housing and reciprocable axially of the housing responsive to changes in pressure of a tire mounted in said rim, a plate member secured to said housing cross-wise of the axis thereof and adjacent the end of said plunger member, one of said members having a non-circular socket and the other member having a matching non-circular projection adapted to enter said socket when the two are in register, said projection and socket normally being out of register but being adapted to be brought into register on twisting of said tubular housing about its longitudinal axis, said tubular housing being effective to untwist and restore said plate member to normal only when said projection is moved out of said socket responsive to an axial movement of said plunger under control of the tire.

3. A tire pressure indicator comprising a hollow body of flexible material disposed between the rim of a wheel and the tire mounted thereon, said body having an integral hollow stem of flexible material projecting through an aperture in the rim, an indicator member secured to the end of said stem and rotatable about the axis thereof to twist the stem, a plunger in the stem extending into said hollow body and movable axially outward under the influence of pressure exerted on said body by the tire, interlocking elements on said plunger and indicator member adapted to hold said indicator member and prevent said stem from untwisting when said shaft has thus been moved outwardly, said interlocking elements effective to release said indicator member and permit said stem to untwist responsive to movement of said plunger axially inward upon a predetermined reduction of the tire pressure.

4. A tire pressure indicator comprising a hollow body of flexible material disposed between the rim of a wheel and the tire mounted thereon, said body having an integral hollow stem of flexible material projecting through an aperture in the rim, a shaft supported in said stem and movable axially thereof responsive to changes in the pressure exerted on said body by the tire, means preventing said shaft from rotating in said stem about its own longitudinal axis, a cap on the end of said stem rotatable about said axis, said cap secured to said stem so it twists the stem upon such rotation and said stem being effective when twisted to impose a restoring torque on said cap, the end of said shaft being non-circular and said cap containing a matching non-circular socket so oriented relative said shaft that said socket is adapted to receive the end of said shaft only when the cap has been rotated to impose a twist in the stem, and said stem being effective to untwist and restore said cap to normal responsive to withdrawal of the end of the shaft from said socket upon axial movement of the shaft under control of the tire pressure.

5. A tire pressure indicator comprising a hollow body of flexible material disposed between the rim of a wheel and the tire mounted thereon, said body having an integral stem of resiliently flexible material projecting through an aperture in the rim, a non-circular tube in said stem extending axially thereof, a non-circular shaft supported in said tube and slidable axially thereof, means connecting one end of said stem to a wall of said hollow body to move therewith responsive to changes in the pressure exerted thereon by said tire, a cap on the end of said stem rotatable about the axis of said shaft, said cap secured to said stem so it twists the stem upon such rotation, said stem being effective when twisted to impose a restoring torque on said cap, said cap containing a non-circular socket so oriented relative to said shaft that said socket is adapted to receive the end of said shaft only when the cap has been rotated to impose a twist in the stem, and said stem being effective to untwist and restore said cap to normal responsive to withdrawal of the end of the shaft from said socket upon axial movement of the shaft under control of tire pressure.

6. A tire pressure indicator comprising a resilient body member adapted to be secured to the rim of a vehicle wheel, a plunger contained in said body and reciprocable axially responsive to changes in the pressure of a tire mounted in said rim, a movable arm secured to said body transverse to the longitudinal axis of said plunger, said arm being adapted to rotate about said axis against the normal tension of said body to an off-normal position, said plunger adapted under the influence of normal pressure in the tire to engage said arm and retain it in said off-normal position but effective responsive to a decrease in tire pressure to move axially and allow said arm to return to normal position, and an electrical contact engaged by said arm on rotation of said wheel when said arm is in said normal position.

7. A tire pressure indicator for a pneumatic tire mounted on a wheel rim, comprising a non-circular tube fixedly positioned on the rim, a non-circular shaft slidably supported in said tube for movement axially thereof under control of the tire responsive to changes in the pressure thereof, a member supported on the rim for rotation about the axis of said shaft, said member having a face transverse to said axis and confronting the tip of said shaft, said face containing a non-circular socket conforming with the cross section of said shaft and adapted to receive said tip when said rotatable member occupies a predetermined angular position relative to said shaft, and means for imposing a torque on said member when it is in said position, whereby said member is adapted to rotate to a different position responsive to withdrawal of said tip from said socket upon axial movement of said shaft.

ROBERT E. GUNTER.

REFERENCES CITED

The following references are of record in the file of this patent:

UNITED STATES PATENTS

| Number | Name | Date |
| --- | --- | --- |
| 2,043,277 | Woodberry | June 9, 1936 |